United States Patent [19]

Peterson et al.

[11] 3,717,557

[45] Feb. 20, 1973

[54] POLYMERIZABLE INTERMEDIATES CONTAINING OLEFIN ANHYDRIDE COPOLYMER AND COPOLYMER OF UNSATURATED OXIRANE, AND UNSATURATED ANHYDRIDE

[75] Inventors: Frank C. Peterson, Leslie P. Theard, both of San Diego, Calif.

[73] Assignee: Gulf Oil Corporation

[22] Filed: Dec. 21, 1970

[21] Appl. No.: 100,510

[52] U.S. Cl....204/159.15, 260/17.4 CL, 260/18 EP, 260/23 EP, 260/30.4 EP, 260/31.8 E, 260/31.4 M, 260/31.4 HR, 260/41 A, 260/41 B, 260/41 AG, 260/37 EP, 260/78.5 T, 260/836, 260/857 UN, 260/873, 260/876 R, 260/878 R, 260/885, 260/886

[51] Int. Cl. .............................................C08g 45/04
[58] Field of Search......260/78.5 T, 836; 204/159.15

[56] References Cited

UNITED STATES PATENTS

| 3,620,990 | 11/1971 | Hazen | 260/78.5 T |
|---|---|---|---|
| 3,637,579 | 1/1972 | Barie | 260/836 |
| 3,637,904 | 1/1972 | Barie | 260/836 |
| 3,441,543 | 4/1969 | Heilman | 117/147 |
| 3,453,246 | 7/1969 | Heilman | 260/78.5 T |
| 3,594,354 | 7/1971 | Hazen | 260/78.5 |
| 3,579,487 | 5/1971 | Haze | 260/78.5 |

*Primary Examiner*—Paul Lieberman
*Attorney*—Meyer Neishlos and Donald L. Rose

[57] ABSTRACT

A new liquid composition comprising a polyanhydride, for example, the copolymer of maleic anhydride and an alpha-olefin, an olefinically unsaturated monooxirane compound such as glycidyl methacrylate, an olefinically unsaturated monoanhydride such as maleic anhydride and an olefin such as styrene. The composition is partially cured through the olefinic groups by ionizing gradiation to an intermediate homogeneous composition which is capable of being molded, particularly when in combination with a substrate such as fiber glass, and is further cured through anhydride and epoxide groups to a solid, infusible resin.

10 Claims, No Drawings

POLYMERIZABLE INTERMEDIATES CONTAINING OLEFIN ANHYDRIDE COPOLYMER AND COPOLYMER OF UNSATURATED OXIRANE, AND UNSATURATED ANHYDRIDE

This invention relates to new polymerizable compositions capable of being partially cured by ionizing radiation to a flexible, non-tacky material which can be easily handled, cut, shaped and mold cured to a solid, infusible resin.

A soft, sticky solution of a polyanhydride, such as the copolymer of maleic anhydride and an alpha-olefin, an olefinically unsaturated monooxirane compound, such as glycidyl methacrylate, and an olefinically unsaturated hydrocarbon capable of polymerization by free radical means, such as styrene, can be partially cured through the olefinic linkages by ionizing radiation to form an intermediate product which is flexible and non-tacky and can be shaped and molded and finally cured through the anhydride and epoxide groups to a solid, infusible resin. However, we have found that in order to produce a satisfactory intermediate product a radiation dosage that is much too high for a commercial economical process is required.

We have discovered a novel resin composition that can be partially cured from a homogeneous sticky solution to a flexible, non-tacky, easily moldable mixture using an ionizing radiation dose of less than 30 megarads and preferably from about 1 or less up to about 10 megarads. Radiation dosages within these limits are well within the range of commercial feasibility. The novel composition that can be readily partially cured in this manner is a solution of a polyanhydride such as that produced by the copolymerization of maleic anhydride and an alpha-olefin, an olefinically unsaturated monooxirane compound such a glycidyl methacrylate, an olefinically unsaturated monoanhydride such as maleic anhydride, and an olefinically unsaturated monomer capable of polymerization by free-radical means such as styrene. This composition, preferably mixed with a substrate such as fiber glass, is a soft, sticky mass which cannot be easily handled, shaped or molded. By partially curing it through the olefinic groups, an intermediate, partially polymerized product can be made which is flexible and non-tacky and can be readily shaped, cut, handled and mold cured in a second stage to a solid, infusible resin.

In the first stage the olefinic double bonds of the olefinically unsaturated components are interreacted by means of the ionizing radiation to produce a linear polymer homogeneously intermixed with the polyanhydride of the initial composition and with unreacted olefinically unsaturated components, if any, without significant reaction of the anhydride and epoxy groups. In the second stage, the anhydride groups and the epoxy groups of the intermediate product are caused to link together at an elevated temperature to form a hard, infusible resin. Unreacted olefinic double bonds from the first stage, if any, are also reacted together in the second stage.

This novel procedure is particularly useful in the preparation of relatively thin sheets of partially cured resin-fiber glass mixtures for second stage curing in matching molds to fully cured products of minimum thickness and close tolerance and of intricate shape such as auto body parts. The solution of the polyanhydride, the olefinically unsaturated monooxirane compound, the olefinically unsaturated monoanhydride and the olefinically unsaturated hydrocarbon with the fiber glass is a soft, sticky mass. It is very difficult to handle and cannot be conveniently mold cured in one stage because of the handling difficulty. In preparing these relatively thin sheets of partially cured resin-fiber glass mixtures, it is convenient to initially place or form the sticky resin-fiber glass mixture between two flexible sheets such as polyethylene to contain the resin and to permit ease in handling until the first stage polymerization has been effected.

We have discovered that polymerization of the olefinic double bonds of the olefinically unsaturated components can be readily carried out by ionizing radiation at a dosage as low as less than one megarad up to about 10 megarads without significant epoxide-anhydride reaction. This procedure converts the soft, sticky mixture into a flexible, non-tacky material which can be readily stripped from the containing sheets and easily handled, cut, shaped and molded. Furthermore, when subjected to molding pressure and temperature, the partially polymerized fiber glass-resin mixture readily flows into intricate mold sections and conforms to the mold prior to polymerization to the hard, rigid product. This polymerized product does not stick to the mold walls and is readily ejected from the mold by conventional means.

The olefinic double bonds of the olefinically unsaturated components of the mixture are preferably polymerized by ionizing radiation under conditions which do not lead to significant epoxide-anhydride reaction. In order to accomplish this the temperature of the mixture is kept relatively low, below 70° C. and preferably below 50° C. However, if some epoxide-anhydride reaction can be tolerated, temperatures somewhat above 70° C. for a limited period can be tolerated. The primary objective of the first stage, olefinic double bond polymerization is to provide a product that is not sticky or tacky and can be readily handled, shaped, cut and molded. The second stage polymerization can conveniently be a thermal cure at an elevated temperature in a heated mold.

The handling and molding characteristics of this intermediate, partially polymerized product are a function of the raw materials used, their relative proportions, the curing temperature, the amount of olefinic polymerization, the amount of anhydride-epoxide polymerization and the like. Thus it is seen that significant control of the properties and characteristics of the intermediate product can be effected by means of these variables.

The extent to which the olefinic double bonds are interreacted in the first stage is dependent on the amount of irradiation to which the material is subjected, other conditions being equal. A useful, non-tacky intermediate product which is suitable for second-stage mold curing is obtained when the olefinic double bonds are only partially polymerized. This intermediate product will contain unreacted olefinically unsaturated monomer homogeneously intermixed with the polymer chains. It can be stored for several days up to several weeks prior to the second stage curing depending, in part, on the amount of the olefinic double bonds that have been reacted, the volatility of the unreacted components and the temperature at which the material is stored.

The resin mixture can be substantially completely olefinically cured in the first stage if desired by increasing the radiation dosage. The intermediate product in which the olefinic groups are more completely copolymerized is more rigid than the product containing only partially copolymerized olefinic groups and is still moldable but cannot flow or conform to intricate molds to the same extent as the product containing the partially polymerized double bonds. The anhydride-epoxide reaction is very slow at room temperature, therefore, these substantially fully olefinically cured intermediate products can be stored for long periods of time awaiting second stage curing. In order to aid moldability of these substantially fully olefinically cured intermediate products they can be initially compounded with a suitable amount of a non-reactive or a reactive component which imparts a plasticizing quality to the intermediate product. Partial, preferably no more than minor, polymerization of the anhydride and epoxide groups in the first-stage cure undesirably increases the rigidity of the intermediate product and tends to interfere with mold curing.

The preferred solid polyanhydride, which is used in conjunction with the olefinically unsaturated monooxirane compound, the olefinically unsaturated monoanhydride and the monoolefin capable of polymerization by free radical means, is prepared by the copolymerization of maleic anhydride and its derivatives with alpha-olefins. The solid polyanhydride is a mixture of polymers of different chain lengths, which can be represented by the general formula:

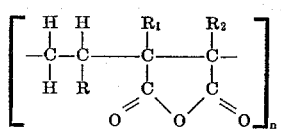

wherein $n$ is between 2 and about 500, preferably between about two and about 200, R is hydrogen, halogen or a straight chain alkyl or halogenated alkyl group having from one to 18 carbon atoms, and $R_1$ and $R_2$ are independently selected from hydrogen, halogen, alkyl having from one to four carbon atoms and phenyl. Additional useful polyanhydrides are encompassed in the definition of U.S. Pat. No. 3,441,543 at column 2, line 64 to column 8, line 53 which is incorporated herein by reference as a part of this disclosure.

Examples of olefin compounds or mixtures of olefins which are preferred to form the solid polyanhydride components of the compositions of this invention include: 1-propene, 1-butene, 1-pentene, 1-hexene, 1-heptene, 1-octene, 1-nonene, 1-decene, 5-chlorohexene-1, 1-undecene, 1-dodecene, 1-tridecene, 1-tetradecene, 1-octadecene, and mixtures thereof and the like.

Examples of maleic anhydride derivatives which are preferred to form the solid polyanhydride components of the invention include: maleic anhydride itself, chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

The solid polyanhydride is made by the copolymerization of the olefin compound and the maleic anhydride derivative.

The copolymerization can be conducted in any suitable manner. One suitable copolymerization procedure involves contacting the olefinic compound with the maleic anhydride in a suitable solvent in the presence of a free radical producing catalyst, such as a peroxide. The molar ratio of the mono-alpha-olefin to maleic anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e., −80° C., can be employed. The upper reaction temperature is determined by the boiling point of the components of the reaction mixture and the predominance of unwanted side reaction.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reaction components. Suitable solvents include, for example, n-pentane, n-hexane, n-octane, toluene, benzene, cumene, xylene, anisole, acetone, tetrahydrofuran, cyclohexane, n-propylacetate, ethylbenzene, di-n-butylether, n-amylacetate, cyclohexanone, bromobenzene, ethylbenzylether, and the like, methylene chloride, di-isopropyl ether, carbon tetrachloride, methylcyclohexane, ethyl-n-butyrate, tetrachloroethylene, methylorthotolylether, methylethylketone.

As the olefinically unsaturated monooxirane compound, we prefer to use glycidyl acrylate or glycidyl methacrylate. Other useful monooxiranes are disclosed in U.S. Pat. No. 3,441,543 at column 9, line 39 to column 11, line 75, which is incorporated herein by reference as a part of this disclosure.

We prefer maleic anhydride as the olefinically unsaturated monoanhydride for the liquid resin composition. Also useful are derivatives of maleic anhydride including chloromaleic anhydride, methylmaleic anhydride, ethylmaleic anhydride, dichloromaleic anhydride, dimethylmaleic anhydride, n-butylmaleic anhydride, phenylmaleic anhydride, diphenylmaleic anhydride, chloromethylmaleic anhydride, bromophenylmaleic anhydride, and the like.

The compositions also comprise an olefinically unsaturated monomeric compound free of both oxirane oxygen atoms and anhydride functionality and containing as its only functional group at least one olefinic double bond capable of polymerization by free radical means. Olefinically unsaturated monomeric compounds which polymerize by a free radical mechanism are well known in the art and are generally alphaolefinically unsaturated compounds which contain substituents directly connected to the beta-carbon atom of the alpha-olefin, which substituents activate the alpha-olefin double bond for polymerization by effecting a net electron withdrawal from the olefinic double bond. Electron withdrawal groups are well known in the art and include halogen, aromatic radical, nitrile, and the like, as disclosed in U.S. Pat. No. 3,441,543 at column 12, lines 1 to 61 and column 13, line 49 to column 15, line 65, which is incorporated herein by reference as a part of the disclosure.

Examples of preferred olefinically unsaturated compounds defined above include styrene, acrylonitrile, methyl methacrylate, vinylidene chloride, acrolein, p-chloro- and bromostyrene, butadiene, vinyl acetate, vinyl bromide, vinyl chloride, and the like, and mixtures of these.

The olefinically unsaturated monooxirane compound, the olefinically unsaturated monoanhydride and the olefinically unsaturated monomer free of oxirane oxygen atoms preferably must have reactivity ratios of one or less for superior results. If a reactivity ratio is greater than one, the olefinically unsaturated monomer preferentially reacts with itself. When the reactivity ratio is one, the monomer shows no preference in its reaction partner. When the reactivity ratios are less than one, each olefinically unsaturated monomer prefers to react with the other types of monomers. Thus, in the case of a mixture of glycidyl methacrylate, maleic anhydride and styrene the reactivity ratios are less than one, therefore, the resulting copolymer comprises randomly distributed glycidyl methacrylate, maleic anhydride and styrene molecules on each chain.

In general, it is preferred that the polyanhydride, the olefinically unsaturated monooxirane compound, the olefinically unsaturated monoanhydride and the olefinically unsaturated hydrocarbon form a liquid solution below 70° C. and more preferably at about room temperature in order to obtain a final, cross-linked resin which is homogeneous and grain-free. Since the polyanhydride and maleic anhydride are solids at room temperature, it is necessary that at least one of the other olefinically unsaturated compounds be liquid at room temperature in order to dissolve the other components and it is preferred that both of the other olefinically unsaturated compounds be liquid at room temperature. Additionally, the liquids must be mutually soluble and capable of solubilizing the solid anhydride.

As indicated, the relative proportions of the four primary constituents, that is, the polyanhydride, the olefinically unsaturated monooxirane compound, the olefinically unsaturated monoanhydride and the olefinically unsaturated hydrocarbon affect the properties as well as the handling and molding characteristics of the intermediate, olefin-polymerized product. These relative proportions can also have a significant effect on the properties of this final fully cured, cross-linked product as well as the overall cost. In general, the ratio of the anhydride groups to epoxide groups that can be employed in the compositions varies over a fairly wide range. Since the mixture of the polyanhydride and the olefinically unsaturated monoanhydride is a mixture of molecules of different sizes and numbers of anhydride groups, the anhydride to epoxide equivalent ratio, i.e., the A/E ratio, is used to express the relative proportions of anhydride and epoxide groups present in the liquid resin composition. The A/E ratio of one mol of maleic anhydride and one mol of glycidyl methacrylate is 1.0. In the compositions described herein the A/E ratio can suitably be between about 0.1:1 and 5:1, but is preferably between 0.3:1 and 2:1 and more preferably between about 0.5:1 and 1.5:1.

As described, the anhydride groups present in the mixture and defined by the A/E ratio are derived both from the polyanhydride and the olefinically unsaturated monoanhydride. The incorporation of the olefinically unsaturated monoanhydride into the resin mixture reduces the radiation dosage required for a suitable intermediate product. With other things remaining constant and within the composition limits specified herein, the radiation dosage required for a suitable intermediate product is reduced as the amount of the olefinically unsaturated monoanhydride is increased. The olefinically unsaturated monoanhydride can suitably comprise from about 5 to about 90 percent of the total anhydride equivalents present and preferably from about 20 to about 80 percent of the anhydride equivalents present in the liquid resin composition.

The amount of the olefinically unsaturated monomer with no epoxide or anhydride functionality can vary between 0 and about 85 percent by weight of the liquid resin composition and preferably between about 30 and about 75 percent of the liquid resin composition. The maximum amount of any particular unsaturated monomer to employ will depend upon its compatibility in the final product, that is, the intersolubility of the components. Thus it has been found that the lower the A/E ratio when using glycidyl methacrylate, the greater the amount of styrene that can be used.

Polymerization of the double bond is highly exothermic (20–22 K.Cal./Mol). Furthermore, since irradiation is a heating process, it adds further to the internal heat in the material under treatment. In view of this, care must be exercised in order that the material does not heat high enough in the first stage polymerization to cause a significant anhydride-epoxide cross-linking reaction such that the material cannot be easily handled or molded. When the fiber glass-resin mixture has been laid down in thin sheets, the exothermic heat of reaction is more readily dissipated than when thick sheets are used. It is because of this exothermic heat of reaction that it is preferred to initiate the first stage reaction with the materials at about room temperature or lower. Furthermore, the rate of the first stage reaction and therefore the heat buildup can be partially controlled by decreasing the intensity of the radiation and increasing the radiation time to obtain the required radiation dosage.

If the product of the first stage polymerization is used soon after it is made, such as within one to several days, it can be temporarily stored for use without problem. However, if only partial copolymerization of the olefinic components is carried out in the first stage, substantial polymerization of the unreacted olefin compounds can take place on prolonged storage such as to affect the subsequent ability to flow and conform to the mold. Thus when the olefinic constituents are substantially completely polymerized in the first stage or prolonged storage is contemplated, it may be desirable to incorporate in the initial mixture a plasticizer or a plasticizing monomer, which possesses the ability to enhance the flow characteristics during molding. Such plasticizing components include epoxidized vegetable oils such as epoxidized soy bean oil, di-2-ethylhexyl phthalate, dioctyl phthalate, dihexyl phthalate, di-isooctyl phthalate, polyethylene glycols such as those having a molecular weight between 600 and 1,000, nadic methyl anhydride, phenyl glycidyl ether, alkyl glycidyl ethers such as octyl and decyl glycidyl ethers and the like.

Refrigeration of the first stage product will reduce polymerization during storage. Generally when the first stage polymerization is carried out as part of an integrated operation, the molding operation is carried out relatively soon in an adjacent unit. In this instance holding time presents no problem. However, when the first stage product is distributed in the channels of commerce, stability over periods of weeks or months may be required. In this instance the use of a plasticizer or a plasticizing monomer can be useful.

The second stage curing accomplishes a cross-linking of the polyanhydride chains and the polyepoxide chains through the anhydride and epoxide functions. This curing is obtained at elevated temperatures. The curing temperature has been found to be critical in order to obtain finally cured resins which have suitable physical properties. Curing temperatures are therefore suitably between about 180° F. and about 400° F., preferably between about 240° F. and about 350° F. For quick cures it is most preferred to use a curing temperature toward the upper end of the range. The curing time is generally between about 30 seconds and about 8 hours depending on the curing temperature, the resin composition and the like. Curing in stages, that is, at different temperatures, can be utilized, however, for simplicity and convenience one stage curing is preferred. Although pressure is not required for the second stage curing, it is usually involved when the intermediate product is mold cured and fortuitously the physical properties of the finally cured product are improved by curing under pressure. Pressures as high as 5,000 p.s.i. and higher are usable herein.

As previously indicated, the resin composition is preferably formed in sheets using a fiber glass binder. The fiber glass can be in the form of a woven glass fabric or randomly distributed glass fibers. When chopped glass fibers are used, they can suitably range from one-eighth inch to 2 inches in length or preferably one-fourth inch to 1 inch in length. Other fibrous material can be used as the core or binder in the form of randomly distributed fibers, fluff, paper, woven fabric, etc. This can be made from natural materials such as cellulose, including sisal, hemp, cotton and linen, asbestos, etc., or a synthetic such as nylon, polyester and the like.

Fiber glass in various forms is well known and commercially available for resin-fiber glass compositions. A lubricant or finish is generally applied to the fiber glass filaments by the manufacturer. It is preferred that the fiber glass filaments comprising the fiber glass material used as the core or binder have a coating or finish which is reactive under the curing conditions with at least one of the resin-forming components. The silane finishes are preferred because they are chemically bonded to the glass filaments and have free reactive groups available for reaction with the resin.

The resin compositions can contain constituents in addition to the monomers and core material such as pigments or dyes for coloring the finished product, plasticizers as mentioned, fillers and the like. The fillers provide the desirable function of reducing the cost of the final product without significantly reducing the physical properties. Suitable filler material includes powdered calcium carbonate, clay, sands, powdered metals such as aluminum and iron, metal oxides such as iron oxide, aluminas, etc., powdered silica, wood flour, walnut shell flour and the like. The filler is preferably inert in the composition, that is, it should not react with any of the reactants or catalyze a reaction involving the reactants. Other additives which can be used are a suitable mold release agent or a material such as poly(methyl methacrylate) or finely ground polyethylene to impart a low profile, that is, a smooth surface, to the finally cured product.

The following examples are set out to illustrate the novel process and compositions of the invention and to provide a better understanding of their details and advantages.

We have found that a polyanhydride prepared from maleic anhydride and an alpha-olefin such as hexene-1 is highly suitable herein. We have also found glycidyl methacrylate to be very suitable as the unsaturated monooxirane compound, maleic anhydride as the olefinically unsaturated monoanhydride and styrene as the unsaturated hydrocarbon. The polyanhydride is a solid at room temperature and is soluble in the glycidyl methacrylate and a glycidyl methacrylate-styrene solution but not styrene alone. Therefore, we find it convenient to mix the polyanhydride in a glycidyl methacrylate-styrene solution. The maleic anhydride is also a solid but presents no special solubility problem.

The polyanhydride that was used in the following examples was prepared by reacting 1-hexane and maleic anhydride in a molar ratio of about 2:1 in the liquid phase. The reaction was carried out in the presence of a mutual solvent at a temperature between 60° and 100° C. using as a catalyst between 2 and 3 weight percent benzoylperoxide based on the maleic anhydride. The copolymer was separated from the solvent and any residual catalyst and then dried. Infrared and nuclear magnetic resonance analysis showed the hexene and maleic anhydride to have combined in a 1:1 molar ratio.

An electron beam linear accelerator was used as a source of the ionizing radiation. An 8 MEV electron beam was produced in a single wave guide-single section linear accelerator at a pulse repetition rate of 180 pulses per second. The beam was directed vertically downward onto a horizontal rotating table at a dose rate of approximately 1 megarad per minute.

The cup mold referred to in the following examples is described in ASTM D731-57. It is designed to measure the molding index of stiff flow thermosetting plastics. We found that the cup mold provided a very useful means for determining the ability of the resin-fiber glass mixture to flow in a mold as a mixture without segregation of the resin and fiber glass and for determining the effect on moldability by varying the formulation. Also the cup mold was very useful for determining the batch-to-batch uniformity of identical formulations.

EXAMPLE 1

A mixture containing 2,400 grams of the 1-hexene-maleic anhydride copolymer described above, 1,728 cc. of glycidyl methacrylate and 3,120 cc. of styrene was prepared. The mixture was stirred for 45 minutes at room temperature until the polyanhydride was fully dissolved. To this solution 6,912 cc. of styrene and 653 grams of maleic anhydride were added with stirring and stirring was continued for 15 minutes until solution was obtained. This was followed by the addition of 438 cc. of carbon tetrachloride and 280.5 grams of an internal mold release agent. Next, 748 grams of finely ground asbestos particles were added with stirring as a low shrink and surface improving additive and 16,973 grams of powdered calcium carbonate filler were added with stirring. The resulting mixture was a readily flowable liquid, creamy in consistency. The resin comprised 17.3 weight percent polyanhydride, 4.7 percent maleic anhydride, 12.4 percent glycidyl methacrylate and 65.6 percent styrene.

This liquid mixture was sprayed onto a flat film of polyethylene together with one-inch chopped fiber glass strands which were mixed and wet in flight with the liquid mixture. The liquid mixture and the chopped fiber glass were fed in an amount to form a final product containing 25 percent fiber glass with the remainder being 32 percent resin and 43 percent filler. A sheet of this liquid mixture-fiber glass composition one-quarter to three-eighths of an inch thick resulted. A second protective film of polyethylene was placed on the upper surface and the material was cut into 1-foot square samples for irradiation.

A series of the 1-foot square samples at room temperature were placed, in sequence, on the rotating irradiation table and irradiated with a dose of nine megarads. The irradiated product was warm to the touch and after cooling was a solid-like material which was non-tacky, was easily shapable by hand and had no spring-back properties. The samples were refrigerated at 40° F. for 12 hours and then a number, with the polyethylene films removed, were pressure molded at about 320° F. for 30 minutes in a cup mold at a pressure of about 4,000 p.s.i. The resulting molded cups were rigid, hard and smooth with a Barcol hardness of 60 to 65. Samples taken from flat laminates molded from similar material under comparable conditions had an average flexural strength of 23.6 × $10^3$ p.s.i. as determined by ASTM D790–59T.

EXAMPLE 2

Another portion of the irradiated samples prepared in Example 1 was stored for 3 weeks at 40° F. The samples were then molded in the same cup mold for 30 minutes at 320° F. and about 4,000 p.s.i. These samples molded and performed the same as in the preceding example. Each sample flowed readily to fill all portions of the mold. Furthermore, the resin and glass mixture was uniform in all portions of the mold. The resulting molded cup possessed excellent surface qualities and physical properties.

EXAMPLE 3

A further portion of the irradiated intermediate product was cured in the cup mold at 320° F. for 5 minutes. The resulting product possessed a Barcol hardness of 60 to 65 and had an excellent appearance.

EXAMPLE 4

The formulation of Example 1 was duplicated except that it was prepared with a fiber glass content of 40 percent with a proportionate reduction in resin and filler. After 24 hours of storage, this formulation molded very well at the same conditions described in Example 1 with good resin-glass flow and surface and physical properties.

EXAMPLE 5

The formulation of Example 1 was duplicated except that one-quarter inch chopped fiber glass strands were used. Separate portions were irradiated with a dosage of 7, 10, and 13 megarads, respectively. The sample that had received seven megarads failed the cup molding test in that the resin flowed away from the glass. The sample that had received 10 megarads produced an excellent molding with uniform resin and glass flow to all extremities of the mold. The sample that had received 13 megarads did not flow well enough to fill out the flow test cup mold.

EXAMPLE 6

The formulation of Example 1 was molded in a center disk plate mold, 15½ inches in diameter and one-fourth-inch thick. The mold was completely filled with the resin-glass mixture to produce a fully cured product, after 30 minutes molding at 320° F., having a good surface and a Barcol hardness of 60 to 65.

We have determined that the more maleic anhydride that is present the lower the radiation dose required for a satisfactory intermediate product. Furthermore, we have also found that the less the styrene present the lower the dose for a suitable intermediate product. By appropriate adjustment of these two variables, the radiation dose required to produce a suitable intermediate product can be lowered to about one or less. The fiber glass is added to give strength to the finally cured product, the more glass the stronger it is, provided that there is enough resin to properly wet the glass. Also the product is increased in strength by the use of longer glass fibers. There can be from 0 weight percent of glass up to 90 percent glass (with no filler) with a preferred range of glass content of about 15 to 50 percent. The filler can be present in an amount of 0 percent up to about 60 percent or more and preferably 25 to 50 percent with fiber glass present. Since there is a maximum as to the total solids, that is, fiber glass plus filler, that can be incorporated into the product, the filler content and the fiber glass content must be balanced for desired properties especially with a formulation using maximum solids. It is generally preferred to use a formulation fully loaded with solids.

Any suitable mold release agent can be used, as required. An internal mold release agent such as zinc stearate can be incorporated into the resin formulation in suitable amounts. Many suitable compositions are commercially available. Or alternatively, a suitable mold release agent can be used on the molds. We have experienced no serious difficulty in the formulations sticking to the molds in the second-stage molding.

In describing the initial curing of the liquid resin composition, we specifically refer to the use of ionizing radiation because the composition is adapted to use only moderate dosages of this free radical initiation technique. However, it is to be emphasized that this liquid resin composition can be cured to a non-tacky, moldable intermediate product with any of the conventional free-radical initiation methods. These methods include the use of free radical chemical initiators such as the low temperature peroxides, for example, methyl ethyl ketone peroxide with cobalt naphthenate promoter and the like, ultra-violet radiation, and the like.

It is to be understood that the above disclosure is by way of specific example and that numerous modifications and variations are available to those of ordinary skill in the art without departing from the true spirit and scope of our invention.

We claim:

1. A method of preparing a handleable, thermosettable, moldable composition which comprises forming a liquid solution of a solid polyanhydride having the general formula

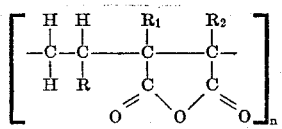

wherein $n$ is between 2 and about 500, R is hydrogen, halogen or a straight chain alkyl or halogenated alkyl group having from one to about 18 carbon atoms, and $R_1$ and $R_2$ are independently selected from hydrogen, halogen, alkyl having from one to four carbon atoms and phenyl;

an olefinically unsaturated monooxirane compound containing as its only functional groups a single oxirane oxygen atom and an olefinic double bond capable of polymerization by free-radical means;

an olefinically unsaturated monoanhydride having an olefinic double bond capable of polymerization by free-radical means; and optionally an olefinically unsaturated monomer containing as its only functional groups at least one olefinic double bond capable of polymerization by free-radical means;

the A/E ratio of said composition being between about 0.1:1 and about 5:1, the anhydride equivalent comprising between about 5 and about 90 percent of the olefinically unsaturated monoanhydride, and the olefinically unsaturated monomer comprising up to about 85 weight percent of the composition, polymerizing at least a portion of the olefinic double bonds of said olefinically unsaturated compounds by ionizing radiation at conditions of time and temperature that substantial polymerization of the anhydride groups and the epoxide groups present in the mixture does not occur whereby a handleable, thermosettable, moldable composition comprising a homogeneous mixture of polyanhydride molecules and polyepoxide molecules is obtained.

2. The method in accordance with claim 1 in which the ionizing radiation is electron beam radiation.

3. The method in accordance with claim 2 in which the composition is irradiated with about one to about 10 megarads.

4. The handleable, thermosettable, moldable composition produced by the method of claim 1.

5. A method of producing a handleable, thermosettable, moldable composition in accordance with claim 1 in which $n$ is between about 2 and 200 and $R_1$ and $R_2$ are hydrogen, the olefinically unsaturated monooxirane compound is glycidyl methacrylate or glycidyl acrylate, the olefinically unsaturated monoanhydride is maleic anhydride, the olefinically unsaturated monomer is styrene and the A/E ratio of said composition is between about 0.3:1 and about 2:1, the anhydride equivalent comprises between about 20 and about 80 percent of the olefinically unsaturated monoanhydride, and the olefinically unsaturated monomer comprises about 30 to about 75 weight percent of the composition.

6. The handleable, thermosettable, moldable composition produced by the method of claim 5.

7. A method of producing a handleable, thermosettable, moldable composition in accordance with claim 5 in which the composition comprises a fiber glass substrate.

8. The handleable, thermosettable, moldable composition produced by the method of claim 7.

9. The method of preparing a handleable, thermosettable, moldable composition in accordance with claim 1 in which the polymerization is carried out at a temperature below about 70° C.

10. The method of preparing a handleable, thermosettable, moldable composition in accordance with claim 1 in which the polymerization is carried out at a temperature below about 50° C.

* * * * *